(12) United States Patent
Maase et al.

(10) Patent No.: US 7,199,868 B2
(45) Date of Patent: Apr. 3, 2007

(54) HIGH PERFORMANCE FINGERPRINT IMAGING SYSTEM

(75) Inventors: Daniel Frederick Maase, Plymouth, MN (US); David Stoltzmann, Bayport, MN (US); Bryan Scott, Albertville, MN (US)

(73) Assignee: Identix Incorporated, Minnetonka, MN (US)

( * ) Notice: Subject to any disclaimer, the term of this patent is extended or adjusted under 35 U.S.C. 154(b) by 0 days.

(21) Appl. No.: 11/261,401

(22) Filed: Oct. 27, 2005

(65) Prior Publication Data

US 2006/0104492 A1     May 18, 2006

Related U.S. Application Data

(60) Provisional application No. 60/624,644, filed on Nov. 2, 2004.

(51) Int. Cl.
    *G06K 9/74*     (2006.01)

(52) U.S. Cl. .................................................... 356/71
(58) Field of Classification Search ................... 356/71
    See application file for complete search history.

(56) References Cited

U.S. PATENT DOCUMENTS

| 4,933,976 | A | 6/1990 | Fishbine et al. |
| 5,416,573 | A | 5/1995 | Sartor, Jr. |
| 5,748,766 | A | 5/1998 | Maase et al. |
| 6,175,407 | B1 | 1/2001 | Sartor |
| 6,285,099 | B1 * | 9/2001 | Takami ........................ 310/51 |

* cited by examiner

*Primary Examiner*—Gregory J. Toatley, Jr.
*Assistant Examiner*—Amanda Merlino
(74) *Attorney, Agent, or Firm*—Beyer Weaver, LLP.

(57) ABSTRACT

A system for optically imaging an object includes an optical platen having an object receiving surface. The object receiving surface is illuminated by a multi-color light source, and a color imaging system forms an image of the object on the object receiving surface.

18 Claims, 4 Drawing Sheets

HIGH PERFORMANCE FINGERPRINT IMAGING SYSTEM

CROSS-REFERENCE TO RELATED APPLICATIONS

This application claims priority under 35 U.S.C. 119(e) to the provisional application entitled: "HIGH PERFORMANCE FINGERPRINT IMAGING DEVICE UTILIZING COLOR IMAGERS, COLOR CORRECTED OPTICS, AND WHITE LED LIGHT SOURCE", U.S. Ser. No. 60/624,644, filed Nov. 2, 2004, which is incorporated herein by reference.

TECHNICAL FIELD

This invention relates to imaging devices for use, for example, with fingerprint imaging systems.

BACKGROUND

Up-to-date fingerprint imaging systems using fingerprint image transfer into electronic data usually apply the known contact method to create a fingerprint pattern. A surface topography of a finger is approximated by a series of ridges with intermediate valleys. When a finger is applied to a surface of a transparent optical plate or prism, the ridges contact the optical plate while the valleys do not and instead serve to form the boundaries of regions of air and/or moisture.

The finger to be imaged is illuminated by a light source located below or near the optical plate. Imaging light from the light source is incident on the surface of the optical plate at an angle of incidence measured with respect to a normal to that surface. Imaging light reflected from the surface is detected by an imaging system that includes some form of a detector.

Components of a typical fingerprint imaging system are oriented so that an angle of observation (defined to be an angle between an optical axis of the imaging system and the normal to the optical plate surface) is greater than a critical angle for the interface between the surface and air at the surface. The critical angle at the surface/air interface is defined as the smallest angle of incidence for which imaging light striking the surface/air interface is totally internally reflected (TIR) within the optical plate. Therefore, the critical angle at the surface/air interface depends on the index of refraction of the air and the optical plate. Another constraint for the angle of observation arises because there is incentive to observe the image at the smallest practical angle of observation, as this reduces distortion due to object tilting. Therefore, the angle of observation is typically chosen to be close to, but greater than the critical angle at the surface/air interface.

A livescan imaging system may be configured to capture four-finger slap, single-finger slap, and rolled fingerprint images. Conventional fingerprint imaging systems of this type may provide 500 pixels per inch (ppi) images. However, it is also desirable to provide more detailed images such as 1,000 ppi images.

Conventional fingerprint imaging platforms use monochrome charged coupled device (CCD) imagers, monochromatic light sources, and anamorphic correcting optics to map an object plane to an image plane. CCD images and electronics, however, are expensive. Optics and opto-mechanics are also expensive, and a monochromatic light source produces light of only one color.

Another platform uses dual, small-format, low frame rate (about 4–5 frames per second (fps)), 1.3 megapixel complementary metal-oxide semiconductor (CMOS) color imagers, a monochromatic light source and monochromatic optics. The object plane is split with each half mapped to one of the pair of imagers. However, performance is not improved relative to other, conventional designs. Low frame rates also produce artifacts and the use of a monochromatic light source limits signal-to-noise in blue and red pixels. Additionally, relatively low imager pixel count limits the contrast transfer function (CTF).

Other livescan systems use two separate imaging chains, one for rolled images and one for four-finger slaps. CCD imagers are employed. Illumination is monochromatic. The four-finger slap imager employs a CMYG (cyan-magenta-yellow-green) color matrix CCD. The four-finger slap imager uses a red monochromatic light source which strongly stimulates the magenta and yellow pixels but weakly (if at all) the green and cyan pixels. Such weak pixel performance must be compensated for by strong equalization producing a pixel dependent noise pattern, or by interpolating strong pixel values to create or enhance weak pixel values. This technique results in inferior performance. Also, the four-finger slap imager provides a low frame rate (about 4 fps), yielding motion artifacts when the fingers move while forming the image.

Still other systems use a light pipe illumination scheme. However, the surface to be illuminated is small (1.6×1.5 inches) and the system is monochrome using light having a wavelength of about 650 nanometers (nm). One such system employs object plane telecentric optics. Another uses a pair of cylinder lenses to provide anamorphic distortion to map the object plane format to the image plane format using the maximum number of pixels (non-square pixels). Another system makes use of a prism pair to anamorphically distort the image in the vertical domain to map the object plane exactly to the image plane to accomplish exactly 500 ppi, square pixels.

SUMMARY

In one aspect, the invention features a system for optically imaging an object. The system includes an optical platen having an object receiving surface. A multi-color light source is positioned to illuminate the object receiving surface. A color imaging system having an image plane is positioned to receive light from the object receiving surface to form an image of the object on the object receiving surface. A lens mechanism is provided to focus light from the object receiving surface onto the image plane and to provide color correction of the focused light.

Various implementations of the invention may include one or more of the following features. The lens mechanism includes an achromat. The lens mechanism includes either one pair of doublets or one pair of doublets and a pair of singlets. The lens mechanism removes a substantial portion of chromatic aberration. The lens mechanism includes an aperture. The system further includes a folding mirror to direct light from the object receiving surface to the lens mechanism. The system may incorporate two folding mirrors. The light provided by the light source has a wavelength of between about 450 and 650 nanometers. The system includes a pair of CMOS imagers. The imagers are tilted at an angle from a normal. The system includes either a CCD or CMOS imager. The system produces 500 and 1,000 pixels per inch images. The system is configured to capture at least four-finger slap, single-finger slap, and rolled fingerprint images. The light source is a white; red and green; blue and green; cyan, magenta and green; cyan, green and yellow; or green, yellow and magenta light source. The light source is selected from a group consisting of a light emitting diode, a cold cathode fluorescent tube, or a plasma panel illuminator. The object is a finger.

In yet another aspect, the invention features a system for optically imaging features on a surface of a hand. The system includes an optical plate means for forming a finger receiving surface. A non-monochromatic light source means is used to illuminate the finger receiving surface. A color imaging means receives light from the finger receiving surface to form an image of a finger on the finger receiving surface. A lens means focuses light from the object receiving surface onto an image plane of the color imaging means and provides color correction of the focused light.

In still another aspect, the invention features a method of imaging an object. The method comprises receiving an object at an object receiving surface of an optical platen. The object receiving surface is illuminated with a multi-color light source. Light from the object receiving surface is collected. The collected light is color corrected and focused onto an image plane of a color imaging system to form an image of the object.

Various implementations of the invention may include one or more of the following features. The received object is a finger. Light from the light source illuminating the optical platen is incident on the optical platen at an angle with respect to a normal to the object receiving surface which is less than a particular critical angle.

In a further aspect, the invention features an illumination source. The illumination source comprises a light output surface and a light receiving surface located substantially orthogonal to the light output surface. A diffusing structure is at the light output surface. A non-monochromatic light source is located adjacent to the light output surface.

Various implementations of the invention may include one or more of the following features. The diffusing structure is an array of microprisms. The light source produces white light; red and green light; blue and green light; cyan, magenta and green light; cyan, green and yellow light; or green, yellow and magenta light. A light source is positioned in respective reflecting end caps located at opposite sides of a cavity formed between the light output surface and a back surface. The back surface is opaque, and the light output surface is clear.

The invention can include one or more of the following advantages. The system supports 500 ppi and 1,000 ppi image capture for four-finger slap, single-finger slap, and rolled finger images with frame rates high enough to avoid artifacts. An increased CTF, up to three times greater than conventional 500 ppi imaging systems, is provided in the 500 ppi mode. The system, in the 1,000 ppi mode, meets or exceeds FBI Electronic Fingerprint Transmission Specification (CJIS-RS-0010) Appendix F at all stimulus frequencies up to and including the frequency where sampling engenders aliasing. The system achieves geometric accuracy better than Appendix F requirements for the 1,000 ppi mode. The system also achieves signal-to-noise performance that is better than Appendix F requirements. The system performs as if it were monochrome in construct. However, the cost of the optics, opto-mechanics, and imager electronics are reduced to levels comparable to or less than conventional 500 ppi fingerprint imaging systems.

The details of one or more embodiments are set forth in the accompanying drawings and the description below. Other features, objects and advantages will be apparent from the description and drawings, and from the claims.

DETAILED DESCRIPTION

As there are advantages to using the fingerprint as an identifier, which cannot be forgotten or lost, the field of application for fingerprint imaging devices is constantly expanding. For example, a fingerprint may be used as an access key.

A fingerprint imaging device may be used to capture four-finger slap, single-finger slap, and rolled fingerprint images. A fingerprint imaging device may also be used to capture palm and full-hand images. Ideally, such a device should not only produce 500 ppi images but 1,000 ppi images as well. Both images should meet or exceed the specified requirements or standards, for example, the FBI Electronic Fingerprint Transmission Specification (CJIS-RS-0010) Appendix F requirements, at all stimulus frequencies up to and including the frequency where sampling engenders aliasing. The fingerprint imaging device should also support higher resolution images and be compatabile with evolving standards.

Figure 1:
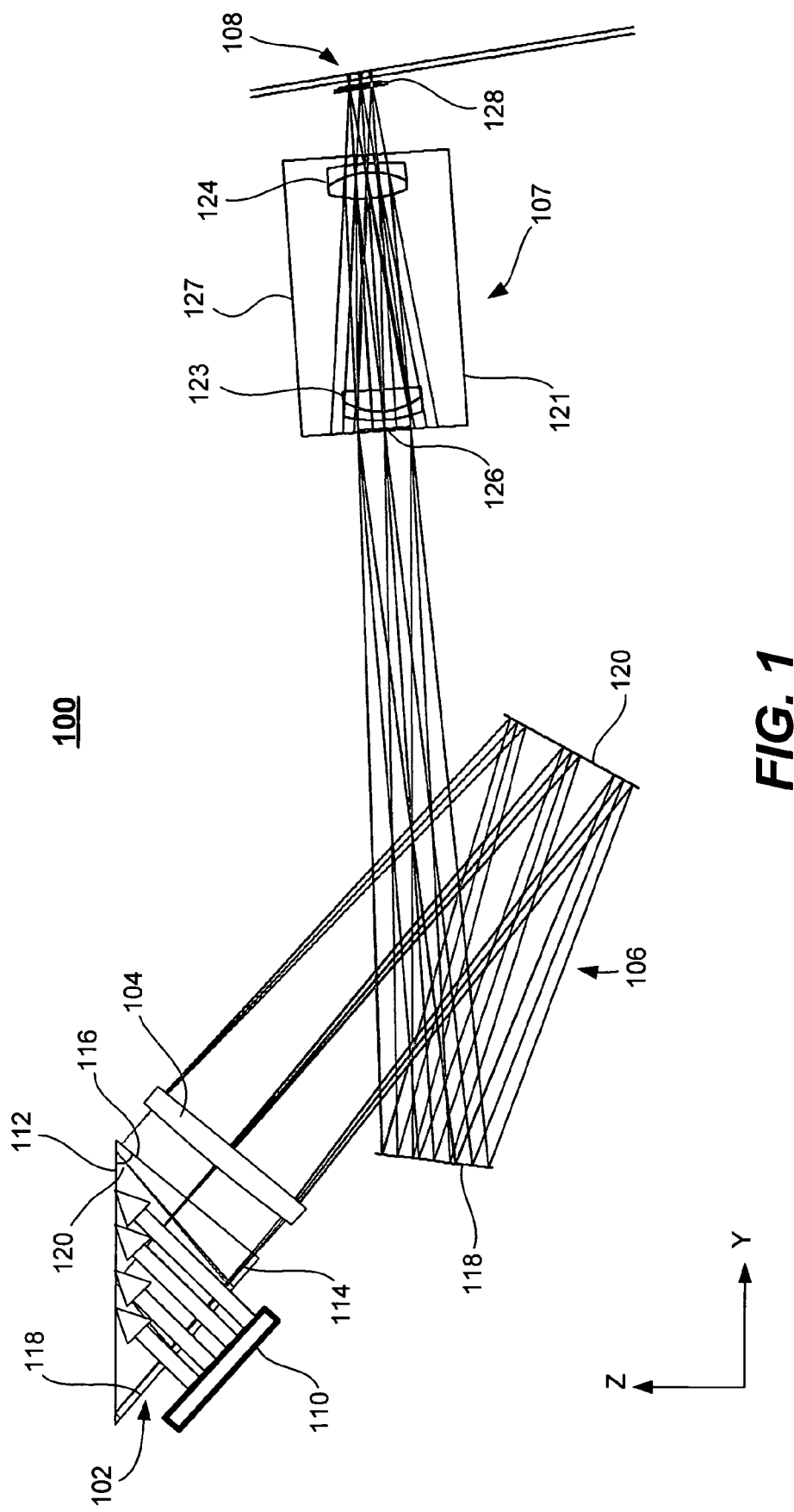
FIG. 1 shows schematically a side sectional view of an imaging system according to the present invention.
Figure 2:
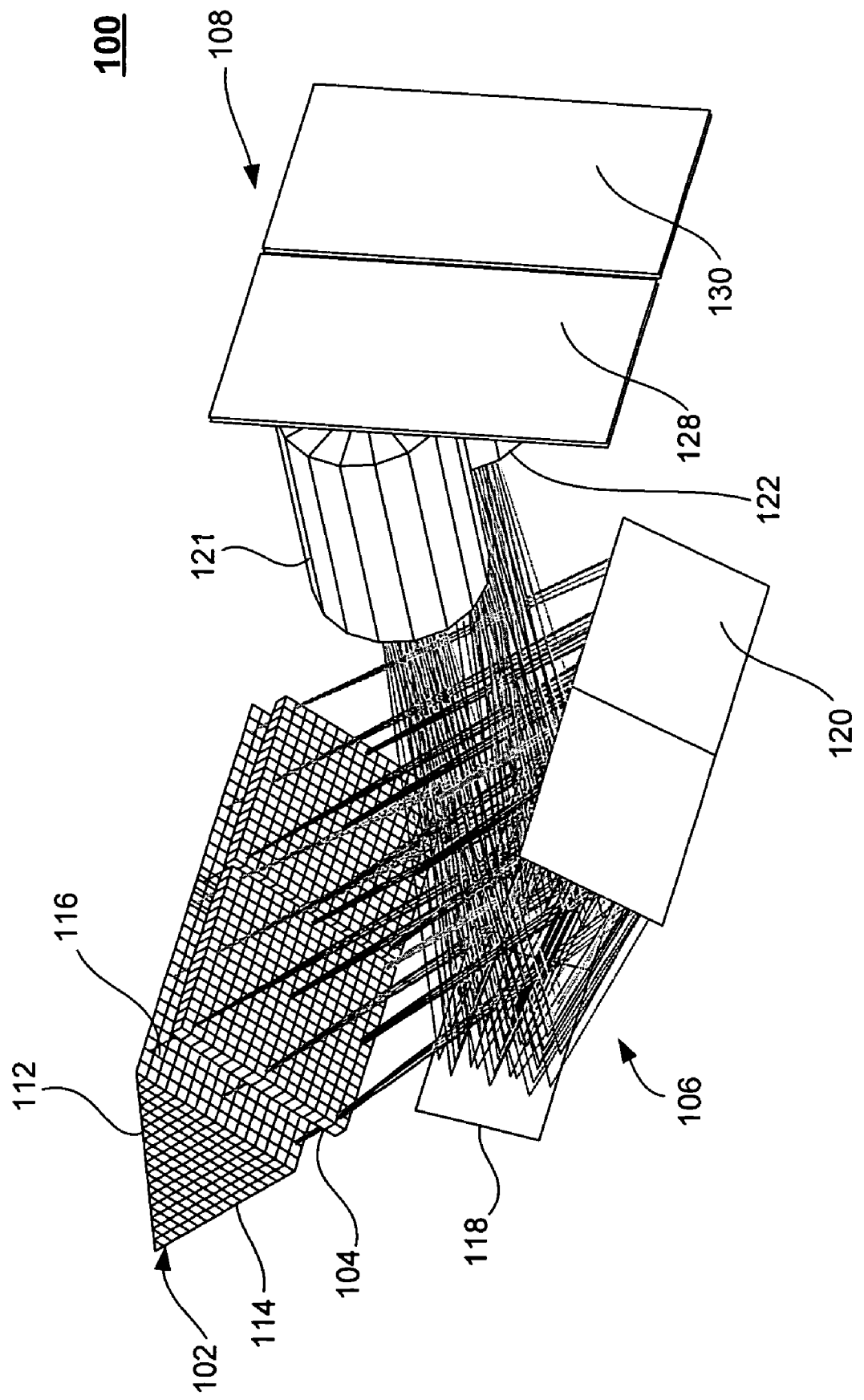
FIG. 2 schematically illustrates a perspective view (without the illumination source) of the imaging system of FIG. 1.

As shown in FIGS. 1 and 2, such a fingerprint imaging apparatus or system 100 includes an optical plate or platen 102, a primary lens 104, a mirror system 106, an objective lens system 107, an image sensor system 108, and an illumination source 110. For further reference, directions Y and Z of the orthogonal coordinate system are shown on FIG. 1 by arrows. A third direction X of this orthogonal coordinate system is perpendicular to the drawing plane of FIG. 1.

The optical platen 102 includes an object receiving surface or finger field 112 located on its top. An object, such as a finger, to be identified is applied to the surface 112. The surface 112 comprises the object plane of the system 100.

The finger field 112 has an optically smooth surface to provide good contact with the finger skin ridges. The finger field regions that interface with the finger skin ridges and valleys form the fingerprint pattern. The finger field has dimensions sufficient for reliable identification of the fingerprint pattern. The object receiving surface is large enough to provide sufficient X-Y dimensions to image four fingers at the same time as well as rolled fingerprint images. The surface of the object receiving surface in the X-Y plane may, for example, be about 86 millimeters (mm) in length (the X-direction) and about 66 mm in width (the Y-direction).

The optical plate or prism 102 includes a first side surface 114 and a second side surface 116 inclined to the finger field 112. The finger field and the surfaces 114 and 116 are planar in shape. Other shapes are possible for either or both of these surfaces, such as, for example, cylindrical shapes, to enhance various characteristics of the fingerprint image.

The surface 114 is configured to receive a source of illumination for the object plane surface 112. The surface 116 is the viewing face through which the illuminated object plane is viewed by TIR. The surface 114 is inclined to the finger field at an angle 118, as shown in FIG. 1. The value of the angle 118 is generally chosen to accomplish the desired illumination of the object plane. The surface 116 is inclined to the finger field at an angle 120. The object plane surface 112 is illuminated through the illumination face 114 of the prism at an angle in the range of 25 to 40 degrees(°). The angles 118 and 120, in one embodiment, may be approximately 40 and 50°, respectively. This embodiment represents bright field illumination. Dark field illumination whereby the object plane is illuminated at an angle approximating 90° may also be utilized. In this case, the finger friction ridges are seen as a bright object on the dark field background. The dark field implementation may be preferable in some cases where packaging of the optics dictates that the illumination be provided from other than a front surface of the object plane prism or plate.

The primary lens 104 is positioned external to the optical plate 102 and behind its lateral surface 116. The primary lens 104 may comprise, for example, a square field lens. The field lens accomplishes telecentricity of rays at the object plane. The lens directs light from the object plane to the objective lens system 107.

When a finger is applied to the object plane, finger ridge detail is viewed by frustrated total internal reflection (FTIR). The optical plate or prism in one embodiment employs the principle of moisture discrimination whereby the index of the refraction of the glass and the viewing angle of the object plane can discriminate the index of refraction of skin from that of both air and water at the object plane surface. This technique is described in U.S. Pat. No. 5,416,573, entitled "Apparatus For Producing Fingerprint Images Which Are Substantially Free Of Artifacts Attributable To Moisture On The Finger Being Imaged", assigned to the assignee of the subject application, and which is herein incorporated by reference.

Specifically, in one embodiment, the image sensor system 108 receives light from the platen surface where air or water is in contact with that surface, but receives significantly less light from regions of the platen surface where friction ridge skin is in contact. Generally, moisture discrimination is implemented with high index of refraction glass to implement TIR with acceptable geometric distortion. Lower index glass is also feasible with associated techniques to correct for geometric distortion and provide acceptable contrast transfer function (CTF) at the associated steeper viewing angle.

The prism may comprise SF-11 glass (index of refraction=1.785) readily available from high quality glass fabricators. The viewing angle 120 is, in one embodiment, as noted, is approximately 50° to accomplish moisture discrimination. A lower index glass may be used, for example, BK7 glass, and the object plane viewed at a lower angle, for example, at an angle of approximately 65°, to accomplish FTIR for skin and water applied to the object plane. Other transparent materials, glass or plastics, for instance, may be used in place of these specific glasses.

The mirror system 106 comprises two fold mirrors 118 and 120. The mirrors may be folded at an angle of about 11° to shorten the optical path length. The mirrors reflect light, as shown, of a wavelength, such as about 450 to 650 nm, produced by the illumination source 110.

As shown in FIG. 2, the objective lens system 107 may comprise a pair of 2-doublet achromats 121 and 122. In this embodiment, there are two doublets for each imager of the image sensor system 108. The objective or the achromat 121, as shown in FIG. 1, includes doublet lenses 123 and 124. The objective or the achromat 122 also includes two doublet lenses (not shown) configured in a similar fashion. Each 2-doublet objective functions as an achromatic lens, thereby removing a substantial portion of chromatic aberration. That is, the objective lenses provide lateral and axial color correction for the wavelengths of interest, for example, about 450 to 650 nm. The lens mechanism 107 also provides a respective aperture stop 126 for each objective that defines an aperture light beam of imaging light rays forming an image of a fingerprint pattern. Other color-corrected lens configurations may be applied in the objective lens to accomplish focus of the image onto the image plane without color aberration. For example, a six element objective comprising two doublets, two singlets, and an aperture stop to provide higher CTF over a wider field of view may be employed.

The doublets may be mounted in a barrel arrangement 127. The barrel arrangement may have a diameter of about 1.50 inches and a length of about 3 inches.

The object plane field of view (FOV) is thus mapped to the image sensor system 108 through color corrected optics, including the fold mirrors. The optics configuration is telecentric at both the object plane and the image plane to provide a broad region of high optical performance, exhibiting small blur spots throughout the FOV for all colors. The vertical FOV, in various embodiments, may be between about 2 and 4 inches.

In one embodiment, the image sensor system 108 comprises a pair of CMOS image sensors 128 and 130. The image sensors are high-pixel density color imagers. The image sensors employed may be three megapixel CMOS devices manufactured by Micron Semiconductor. Alternatively, the image sensors may use fewer than or more than three megapixels. Single imagers may be employed depending on the horizonatal field of view to be imaged and the available imager horizontal and vertical pixels.

The image sensor or sensors provide digital output data at frame rates of about 12 frames per second or greater. The frame rate is high enough to avoid artifacts. The sensors are tilted to accomplish Scheimpflug correction of trapezoidal image distortion and variation in focus in vertical FOV caused by the steep viewing angle. The sensor angle is between 2 and 11° and is a function of the object plane viewing angle 120. The sensors may be tilted, in one embodiment, at an angle of about 2.8° from the image axis. Each sensor views a portion of the total FOV. For instance, in the illustrated embodiment, each imager or sensor views approximately half of the total FOV.

The imager sensor or sensors may use a RGB (red-green-blue) color matrix or a CMYG (cyan-magenta-yellow-green) color matrix. Also, color CCD imagers may be used in place of the color CMOS imagers.

As shown in FIG. 1, the illumination source 110 is arranged and operated to illuminate the finger field 112. The illumination source 110 is a multi-color or non-monochromatic light source. The illumination source, in one embodiment, may be a white light source producing light in the range, for example, of about 450 to 650 nm. The illumination source, in other embodiments, may be a red and green; blue and green; cyan, magenta and green; cyan, green and yellow; or green, yellow, and magenta light source. The illumination source may be radiation sources such as light emitting diodes (LEDs), cold cathode fluorescent tubes, or plasma light panels.

Figure 3:
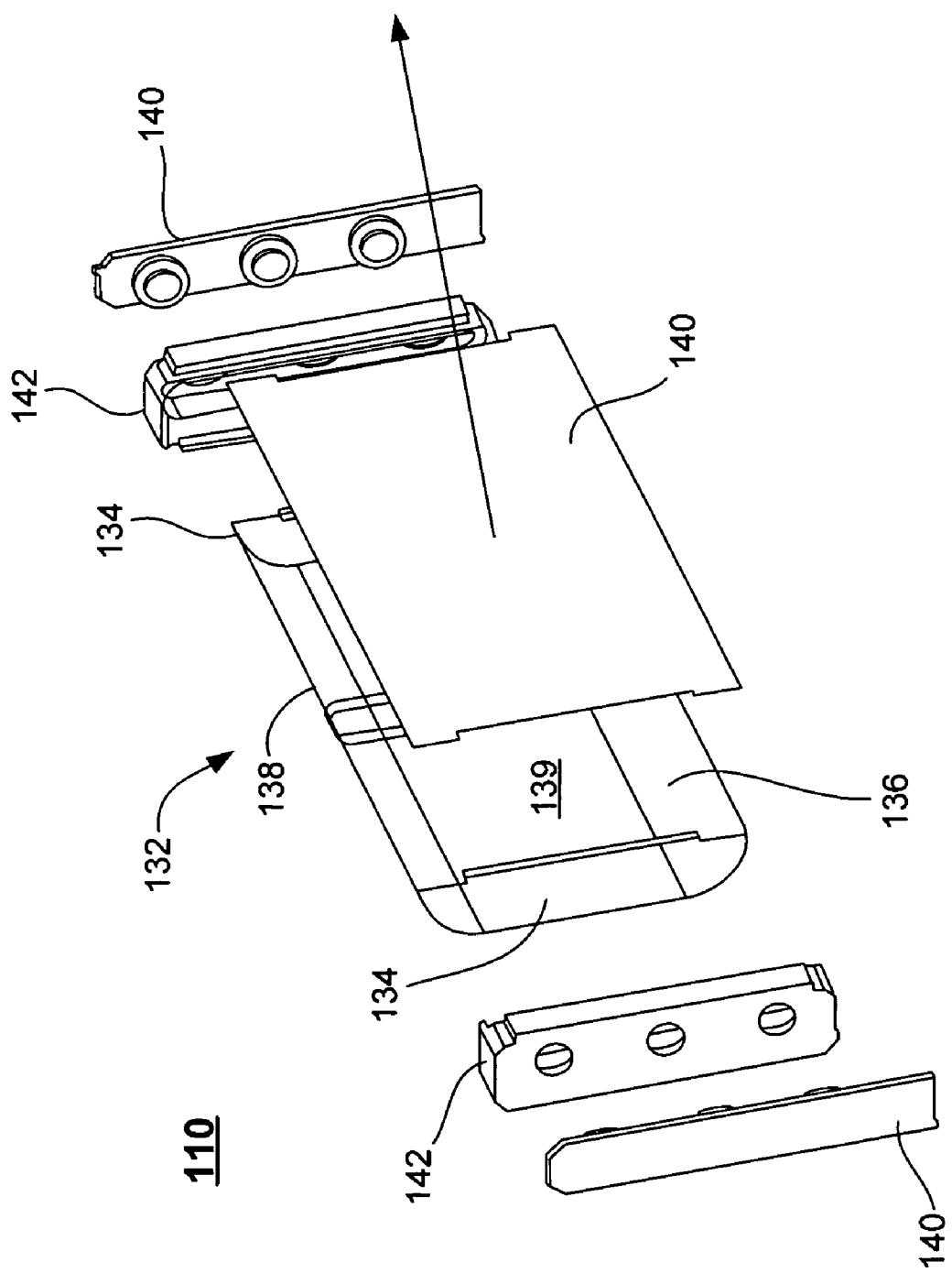
FIG. 3 schematically illustrates the illumination source of the imaging system of FIG. 1.

As shown in FIG. 3, the illumination source may be a light pipe 132. The light pipe includes light receiving surfaces 138 substantially orthogonal to a light input surface 134. The light output surface 136 is spaced from and substantially parallel to an outside light receiving or back surface 138. An open space or cavity 139 is formed between the light output surface 136 and the back surface 138.

The light pipe may be constructed of clear acrylic. The outside surface 138 of the light pipe, opposite the light output surface, may be opaque white. For example, this surface may be painted or coated to be opaque. Internal surfaces of the light pipe are constructed to provide uniform illumination of the painted surface.

A diffusing structure 140 is positioned at the output face 136 of the light pipe. The diffusing structure diffuses minute irregularities in the light output from the surface 136 and deflects undesirable light entering the system through the object plane away from the light pipe. The diffusing structure may comprise an array of microprisms. The microprism array may be a Vikuiti Display Enhancement Film available from the 3M Corporation, St. Paul, Minn. The microprism structure may be molded into the front face 136 of the light pipe. Alternatively, the microprism structure may be formed as a separate part form the surface 136.

The light source, in one configuration, includes LED devices 140 mounted in respective reflecting end caps 142 mounted on or adjacent to the light pipe light receiving surfaces 134. The devices 140 are high output white (approximately 3000K) LEDs. The LEDs produces white light in the range, for example, of about 450 to 650 nm.

The illumination source provides uniform illumination at the surface 112. This reduces the amount of gain equalization necessary across the FOV, thereby increasing signal to noise and ensuring high grayscale contrast. Additionally, the illumination scheme has the benefit of weakly imaging latent fingerprint ridge residue left on the object plane 112 by oil and other residue on the finger. Thus, this illumination scheme provides a relatively high contrast ratio with low noise.

The CMOS imager outputs are digital with output data corresponding to red (R), green (G), and blue (B) components of the applied light. The white light stimulates all RGB components with equal illumination, first order. Second order variations due to (1) illumination differences in the three primary colors, (2) Bayer filter losses, and (3) imager RGB channel gain imperfections are compensated for by first normalizing the RGB imbalances to accomplish equal outputs per channel across the dynamic range of the imagers followed by illumination equalization to compensate for second order variations in the illumination profile.

Figure 4:
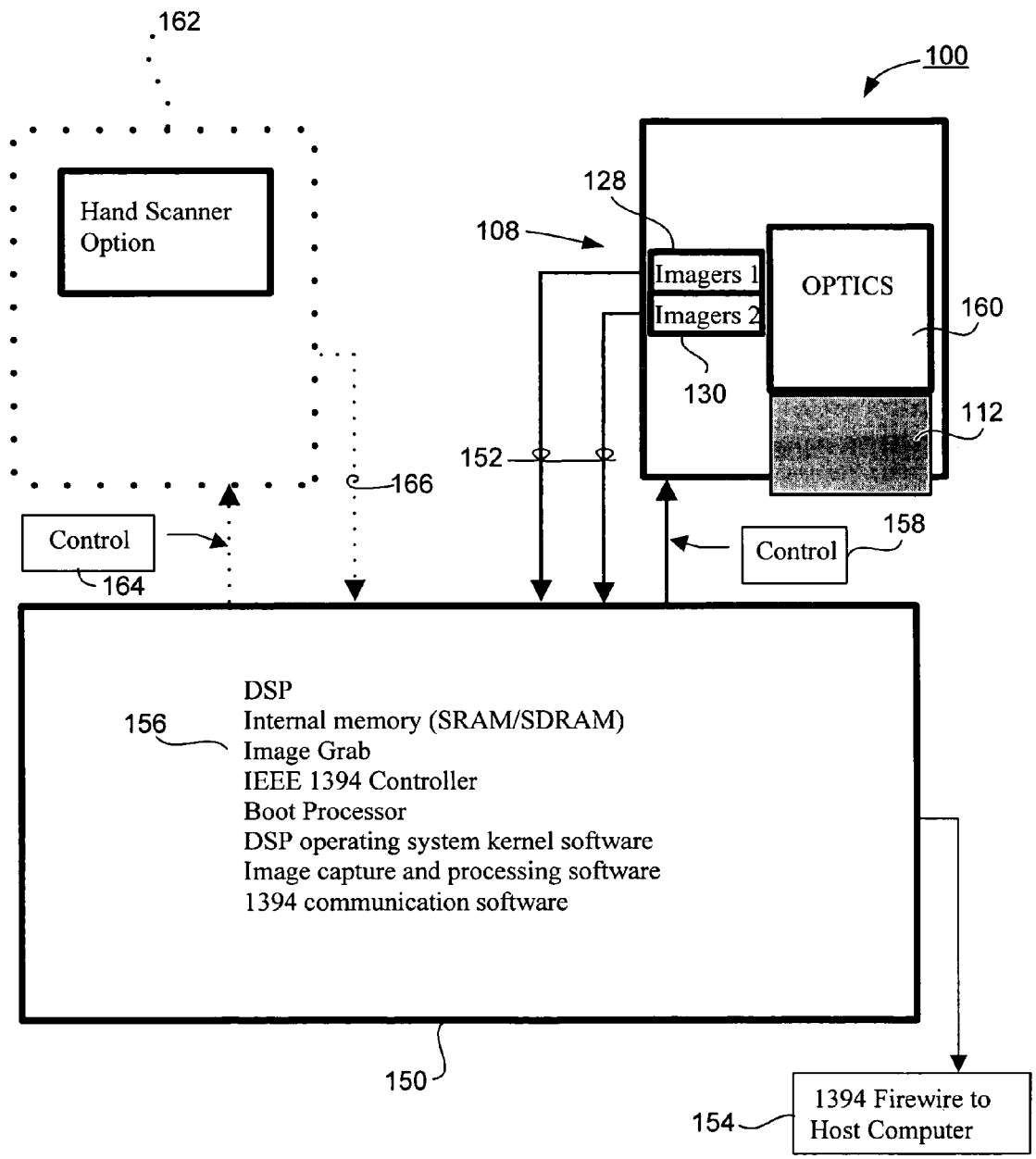
FIG. 4 schematically illustrates a processing system for the imaging system of FIG. 1.

As shown in FIG. 4, processing of image data, from imagers 108, derived from imaging surface 112, is accomplished in a special purpose digital signal processing (DSP) computer 150. The computer 150 receives image output data 152 from the fingerprint image sensors or imagers 128 and 130. This processed image data conforms to the FBI specified requirements, for example, the FBI Appendix F specifications. The processed images are outputted to a host computer (not shown) via an IEEE 1394 Firewire link 154 for assembly into a record comprised of a set of images and textual data. An image grab 156 of the computer 150 may be implemented using a technique such as that described in U.S. Pat. No. 5,748,766, entitled "Method and Device for Reducing Smear in Rolled Fingerprint Image," or the technique described in U.S. Pat. No. 4,933,976, entitled "System for Generating Rolled Fingerprint Images", assigned to the assignee of the subject application, and which are herein incorporated by reference.

The computer 150 also controls, as represented by control box 158, the operation of the image sensor system 108 and the illumination source 110. The optics of the imaging system 100 are represented by box 160.

In another embodiment, data may be transferred to the host computer prior to processing into final fingerprint form. The final fingerprint processing would then be accomplished in software or a combination of hardware and software on the host computer.

Also, an optional hand scanner 162 may be used in conjunction with the imaging system 100. The hand scanner operates under the control, control box 164, of the computer 150. The computer receives image output data 166 from the hand scanner 162. The hand scanner 162 may be of the type described in U.S. Pat. No. 6,175,407, entitled "Apparatus And Method For Optically Imaging Features On The Surface Of A Hand", assigned to the assignee of the subject application, and which is herein incorporated by reference.

A number of implementations and techniques have been described. However, it will be understood that various modifications may be made to the described components and techniques. For example, advantageous results still could be achieved if steps of the disclosed techniques were performed in a different order, or if components in the disclosed systems were combined in a different manner, or replaced or supplemented by other components.

For example, the optical layout of the imaging system 100 may use only one fold mirror or more than two mold mirrors. It is also possible, in one embodiment, to eliminate the fold mirrors entirely by either reducing the front and back focal length or the objective lens and/or packaging the optics system in a longer housing. The objective lens system may comprise some lens combination other than a pair of doublets. For instance, a combination of three pairs of doublets may be used to provide higher CTF over a larger FOV. Also, objects other than a finger may be imaged by the imaging device.

Additionally, instead of two imagers, only one imager may be employed. A smaller prism could be used and the prism illuminated by an LED white light source. The FOV could be mapped to a single high-pixel density color CMOS imager through color corrected optics with magnification reduced to increase resolution. The single CMOS imager embodiment may also use a larger prism with magnification increased to yield a lower resolution image but over a much larger FOV. In another configuration, the light source, as discussed, may be multi-color providing more then one wavelength of light through color-corrected optics to stimulate more than one pixel color at the CMOS or CCD imaging device. For example, a CMYG (cyan-magenta-yellow-green) imager might be efficiently illuminated with a light source that would stimulate three of the four imager colors, but not the fourth. The color correction in the optics would be easier by virtue of the smaller spread of wavelengths that would have to be supported and the illumination could be accomplished with bi-color LEDs.

A number of embodiments of the invention have been described. Nevertheless, it will be understood that various modifications may be made without departing from the spirit and scope of the invention.

What is claimed is:

1. A system for optically imaging an object comprising:
an optical platen having an object receiving surface;
a multi-color light source positioned to illuminate the object receiving surface;

a color imaging system having an image plane and positioned to receive light from the object receiving surface to form an image of the object on the object receiving surface;

a lens mechanism configured to focus light from the object receiving surface onto the image plane and configured to provide color correction of the focused light; and wherein the object is any part of the hand.

2. The system of claim 1 wherein the lens mechanism includes an achromat.

3. The system of claim 2 wherein the lens mechanism includes either one pair of doublets or one pair of doublets and a pair of singlets.

4. The system of claim 1 wherein the lens mechanism is configured to remove substantial portion of chromatic aberration.

5. The system of claim 1 wherein the lens mechanism includes an aperture.

6. The system of claim 1 further including a folding mirror configured to direct light from the object receiving surface to the lens mechanism.

7. The system of claim 6 wherein there are two folding mirrors.

8. The system of claim 1 wherein the light provided by the light source has a wavelength of between about 450 and 650 nanometers.

9. The system of claim 1 wherein the imaging system further includes a pair of CMOS imagers.

10. The system of claim 9 wherein the imagers are tilted at an angle from a normal.

11. The system of claim 1 wherein the imaging system includes either a CCD or CMOS imager.

12. The system of claim 1 configured to produce 500 and 1,000 pixels per inch images.

13. The system of claim 1 being configured to capture at least four-finger slap, single-finger slap, and rolled fingerprint images.

14. The system of claim 1 wherein the light source is a white; red and green; blue and green; cyan, magenta and green; cyan, green and yellow; or green, yellow, and magenta light source.

15. The system of claim 1 wherein the light source is selected from a group consisting of a light emitting diode, a cold cathode fluorescent tube, or a plasma panel illuminator.

16. A system for optically imaging features on a surface of a hand comprising:

an optical plate means for forming a receiving surface for any part of the hand;

a non-monochromatic light source means for illuminating the receiving surface;

a color imaging means for receiving light from the receiving surface to form an image of any part of the hand on the receiving surface; and a lens means for focusing light from the receiving surface onto an image plane of the color imaging means and for providing color correction of the focused light.

17. A method of imaging an object comprising:

receiving an object at an object receiving surface of an optical platen;

illuminating the object receiving surface with a multi-color light source;

collecting light from the object receiving surface; and color correcting and focusing the collected light onto an image plane of a color imaging system to form an image of the object wherein the object is any part of the hand.

18. The method of claim 17 wherein light from the light source illuminating the optical platen is incident on the optical platen at an angle with respect to a normal to the object receiving surface which is less than a particular critical angle.

* * * * *